April 4, 1944.  C. G. JOA  2,345,937
FEED FOR WOODWORKING MACHINE
Filed Aug. 1, 1940  2 Sheets-Sheet 1
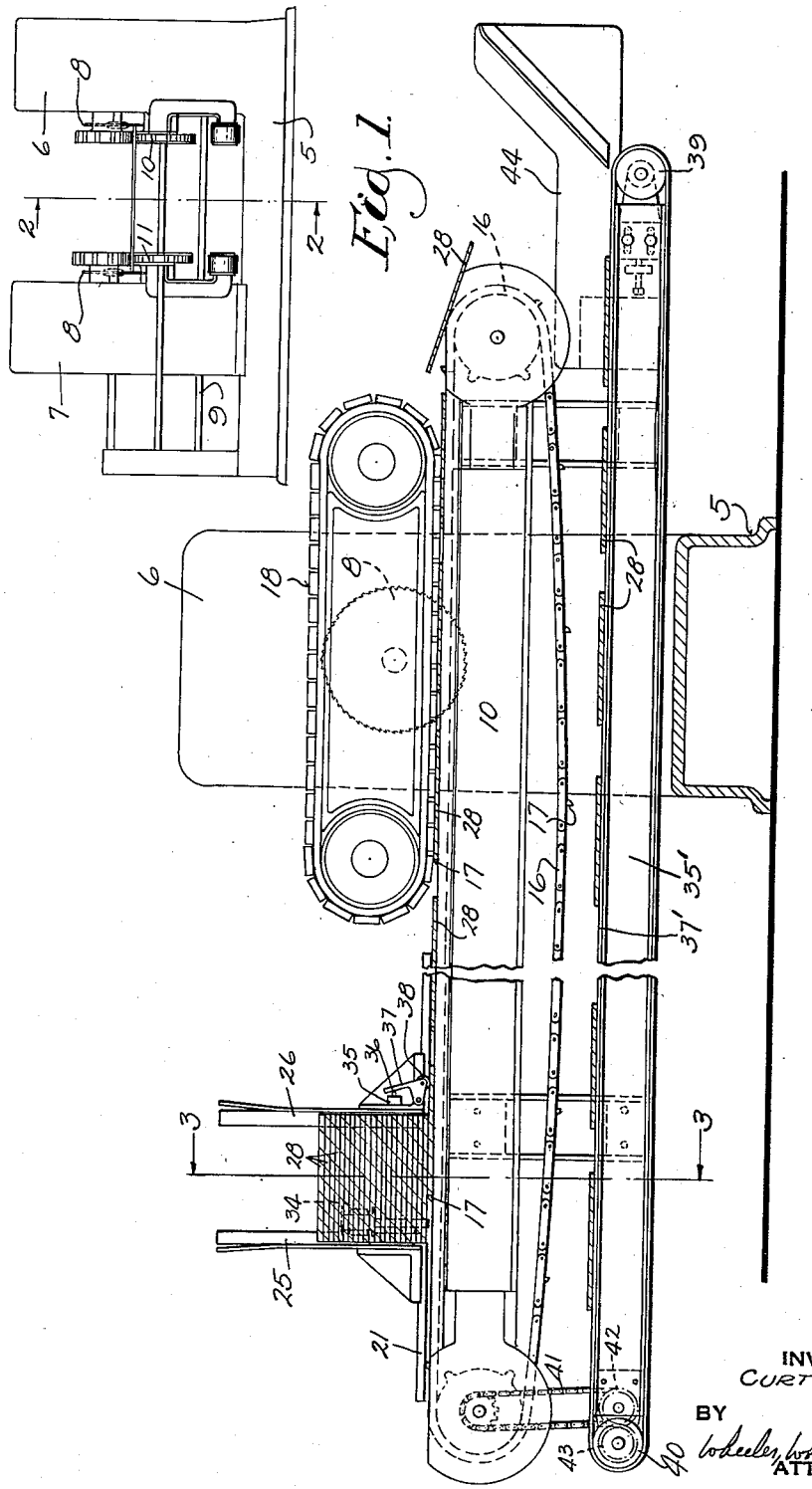
INVENTOR
CURT G. JOA
BY
Wheeler, Wheeler + Wheeler
ATTORNEYS.

April 4, 1944. C. G. JOA 2,345,937
FEED FOR WOODWORKING MACHINE
Filed Aug. 1, 1940 2 Sheets-Sheet 2

INVENTOR
CURT G. JOA
BY
Wheeler, Wheeler & Wheeler
ATTORNEYS.

Patented Apr. 4, 1944

2,345,937

UNITED STATES PATENT OFFICE 2,345,937

FEED FOR WOODWORKING MACHINES

Curt G. Joa, Sheboygan Falls, Wis., assignor to Curt G. Joa, Inc., Sheboygan Falls, Wis., a corporation of Wisconsin Application August 1, 1940, Serial No. 349,062

13 Claims. (Cl. 144—245)

This invention relates to improvements in feeds for woodworking machines.

It is the object of the invention to speed up the operation of a woodworking machine of the type having two relatively adjustable columns each of which may be provided with woodworking tools. More specifically, it is an object of the invention to provide a hopper made up of four quarter sections which are adjustable to and from each other in pairs with the respective columns and certain of which are individually adjustable transversely on their supports from the respective columns, whereby to be adapted to receive work pieces of any size and style and to feed such work pieces automatically to the tools.

It is a further object of the invention to provide a novel and improved arrangement whereby a return conveyor brings the finished work back to the loading station so that the machine may be attended by a single operator without requiring such operator to go from side to side of the machine to handle the work.

Other objects of the invention will be apparent upon study of the following disclosure thereof.

In the drawings:

Fig. 1 is a view on a small scale showing the inside elevation of the machine to which the invention is applicable.

Fig. 2 is an enlarged view taken in section on the line 2—2 of Fig. 1.

Like parts are identified by the same reference characters throughout the several views.

The drawings are partially diagrammatic in that they do not show the details of the machine or the tools carried thereby, these features being specifically unimportant to the invention. Fundamentally, the machine comprises a base 5 supporting two columns 6 and 7 respectively. It is immaterial whether both columns are movable. As illustrated column 6 is fixed to the base and column 7 is adjustable to and from the column 6. It is likewise immaterial what tools are mounted in the respective columns. Planers, drills, saws, and various channeling and grooving, cutting and boring devices are alternatively usable in machines of this general type. By way of illustrating the presence of tools on the respective columns I have shown each column provided with a rotary saw at 8. Column 6 is usually made to carry the driving mechanism (not shown) and a splined shaft 9 extends from column 6 to column 7.

Figure 3:
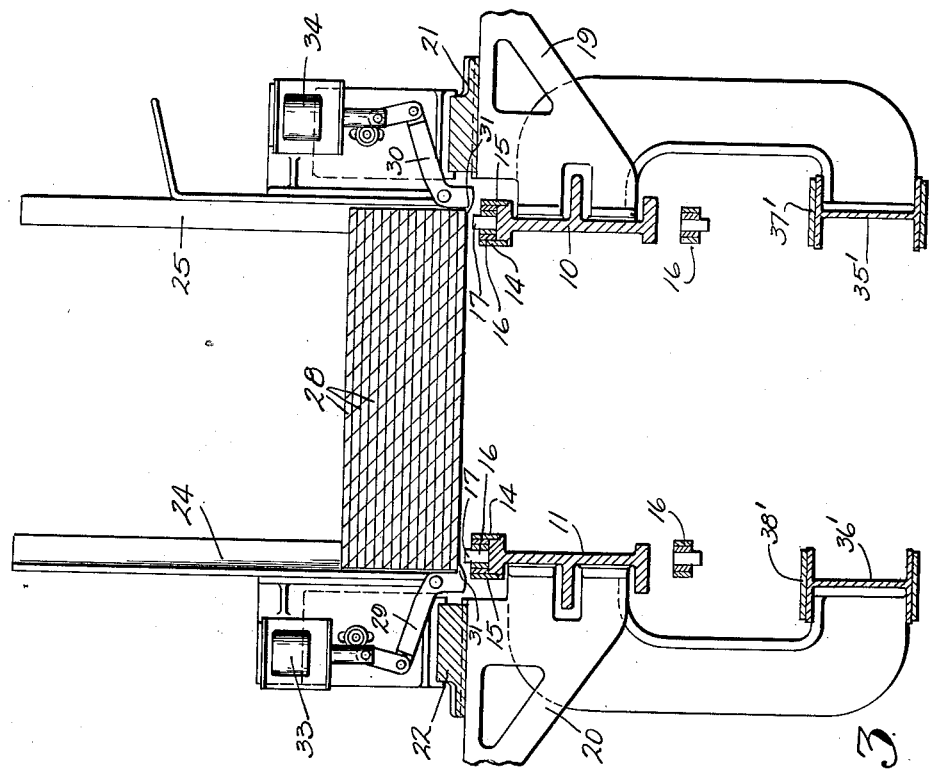
Fig. 3 is a still further enlarged detail view in cross section on the line 3—3 of Fig. 2.

Each column is provided with a bed for the work conveyor. The bed 10 of column 6 projects into the space between the columns, as does the bed 11 carried by column 7. As shown in detail in Fig. 3 and Fig. 2, each of the beds 10 and 11 preferably comprises an I-beam which extends far out to the side of the base 5 in each direction. Each of the beds 10 and 11 carries on its upper sides spaced rails 14 and 15 between which operates a conveyor chain 16 having upwardly projecting driving lugs 17. The two conveyor chains 16 operate in unison and the conveyor lugs 17 are opposite each other for the uniform propulsion of work resting on the rails 14, 15 and spanning the space between the columns. Thus the relative movement between the columns which brings the two conveyors 16 relatively closer together or farther apart is adapted to accommodate work pieces of any desired width.

Co-operating with the feed conveyors 16 are clamping conveyors 18 likewise mounted individually on the respective columns and adapted as best shown in Fig. 2 to hold the work firmly upon the bed rails 14 and 15 during propulsion by conveyor 16, while the work is being acted on by the saws 8 or such other tools as may be provided.

Figure 4:
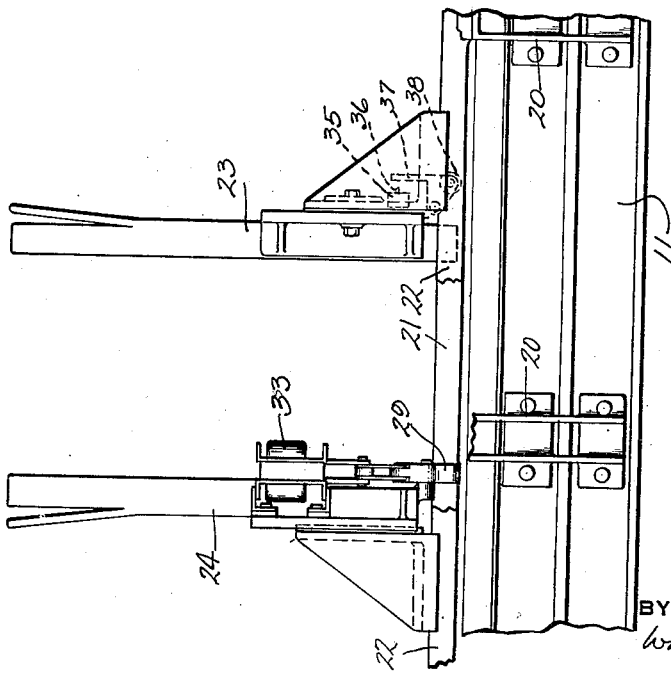
Fig. 4 is a fragmentary rear elevation of certain of the hopper sections.

Mounted upon the beds 10 and 11 and projecting at opposite directions therefrom, are the brackets 19 and 20 which support transverse beds 21 and 22 respectively, upon which the four corner sections of the hopper are supported and preferably individually adjustable. Two such sections are mounted at 23 and 24 upon the cross bed 22 as shown in Fig. 4. Two other sections 25 and 26 are mounted on the cross bed 21 as shown in Fig. 2. Each corner section comprises an angular element adapted to embrace the corners of the stacked work pieces 28. As above indicated, the separation of the cross beds 21 and 22 by adjustment relatively between the columns serves to receive wider or narrower work pieces. The adjustment of corner elements 23 and 26 with respect to corner elements 24 and 25 by sliding one or both pairs of elements on the cross beds 21 and 22 permits of an increase or decrease in the length of the work pieces 28. Thus work pieces of any desired sizes may be accommodated by a hopper thus constructed.

The angular corner pieces 23, 24, 25 and 26 comprising the hopper terminate above the rails 14 and 15 at a spacing which is slightly greater than the thickness of one of the work pieces 28 to allow the lugs 17 of conveyor chains 16 to propel successive work pieces from the bottom of the hopper. Because of the potential size of the work pieces accommodated by the apparatus, however, it would not do to allow the superposed stack of work pieces simply to fall onto the conveyor chains following the removal of the lowermost work piece, as one side of the stack would fall well in advance of the other and the entire stack would thus be displaced and might jam in the hopper.

Accordingly I control the discharge of work pieces from the hopper automatically by the provision of feed levers 29 and 30 associated with the hopper corner sections 24 and 25 respectively. Each of the levers 30 is provided with a pawl 31 adapted to hook below the face of the work piece which is next to the bottom of the hopper following the preliminary withdrawal movement of the lowermost work piece. The levers 29 and 30 are connected to the armatures of solenoids 33 and 34 respectively and are subject to the control of conventional switches 35 mounted on the hopper corner sections 23 and 26 respectively. These switches are so biased as to be normally closed when relieved of pressure. Each switch has a stem portion 36 projecting to receive the pressure of lever 37 which carries a cam follower roller 38 disposed in the path of movement of the lowermost work piece as it is pushed from the hopper. As long as the cam roller 38 rides on the work piece the switch remains open and the pawls 31 support the rear end of the successive work piece in the hopper. The finished end of such work piece remains supported on the outwardly moving work piece which is being propelled by the conveyor. The synchronization achieved by the location of the cam roller 38 is such that as soon as the propelled work piece leaves the hopper the cam roller clears such work piece and falls downwardly, allowing spring switch 35 to close, thereby retracting pawls 31 and permitting the other end of the next work piece to drop on to the bed in a position for propulsion by the next successive lugs 17 of the conveyor chains 16. No matter what the relative adjustment between the corner sections of the hopper, the same timing will persist due to the fact that the pawls are located on the rear corner sections of the hopper and the switch and its cam control mechanism is in each instance located on one of the forward corner sections of the hopper.

Due to the presence of the hopper, never heretofore thought practical on a machine of this character, the operator can load quite a large number of work pieces into the machine at one time and would then remain idle but for the possibility of using his services in taking care of the work pieces on which the machine has operated. Accordingly means is provided for returning the finished work pieces to the same loading station and such means is likewise self-adjusting to the spacing between the columns.

Beneath the bed members 10 and 11 each column carries supplemental bed members 35' and 36', each of which may comprise an I-beam. Conveyor belts 37' and 38' operate about pulleys 39 and 40 carried by the ends of the respective I-beams. Whereas the work feed conveyor which moves the work pieces past the tools operates from left to right as viewed in Fig. 2, the return belt conveyor comprising belts 37' and 38' is driven by chain 41 and gears 42 and 43 to return the work pieces from right to left. The work pieces leaving the beds 10 and 11 are simply dropped by conveyors 16 between the guides 44 at the rear of the machine and thus fall directly upon the belts 37' and 38' by which such finished work pieces are returned to the loading station beneath that portion of the machine in which work is done on such pieces.

It will thus be understood that the machine as herein disclosed retains the universal adaptability of a two column woodworking machine in being adapted to receive work pieces of any length or width within the capacity of the machine and yet has been provided with the advantages of a hopper and return feed easily adjustable and, in fact, largely self-adjusting in the mere movement of the columns, to accept the various sizes of work pieces.

I claim:

1. A machine having relatively adjustable beds and separate conveyor means mounted upon the individual beds, and a hopper comprising pairs of corner elements connected with the respective beds whereby the corner elements of the respective pairs are movable to and from each other with the respective beds to accommodate work pieces of differing length, the corner elements of each pair being also provided with means supporting them for relative adjustment with respect to each other longitudinally of the respective conveyor means upon the respective beds whereby to be adapted to accommodate work pieces of differing width.

2. In a machine of the character described, adapted to handle work pieces of differing dimensions, a hopper comprising four corner sections, beds movable to and from each other upon which said sections are mounted in pairs, one section of each pair being adjustable upon its said bed to and from the other section of said pair in a direction at right angles to the direction of movement of the beds to and from each other, whereby to accommodate work pieces of differing width.

3. In a machine of the character described, the combination with a base and a column thereon, of a second column adjustable on the base to and from the first column, a tool carried by each of said columns and adapted to act on work fed between said columns, beds connected with the respective columns to partake of relative adjustment therebetween, conveyors individually mounted upon and operable across the respective beds to propel work between said columns past said tool, a hopper including sections connected with the respective beds to partake of column movement, each of said hopper sections comprising individual hopper corners, and means upon which said corners are relatively adjustable along the respective beds longitudinally of said conveyors, whereby to accommodate work pieces of differing width irrespective of length as well as work pieces of differing length irrespective of width.

4. In a machine of the character described, the combination with a base and a column thereon, of a second column adjustable on the base to and from the first column, beds connected with the respective columns at points spaced above said base to partake of relative adjustment therebetween, conveyors independently mounted and individually operable across the respective beds to propel work between said columns, a hopper including sections connected with the respective beds to partake of column movement, separate conveyor means independently connected with the respective columns to partake of relative adjustment thereof and disposed below said beds in positions for receiving and supporting work which has passed through the machine between the columns, and means for operating said last mentioned conveyors in directions for the return of such work pieces to a position adjacent said hopper sections, adjustment of said second column to adjust said beds automatically effecting adjustment of the work propelling conveyors upon said beds and the work of returning conveyors below said beds to handle work of differing dimensions.

5. In a machine of the character described, the combination with a bed and a pair of spaced columns mounted on the bed for relative adjustment, a tool mounted upon each of said columns for operating on work fed between the columns at predetermined points respecting the ends of the work pieces irrespective of their length, conveyor means comprising separate conveyors independently mounted upon the respective columns for propelling work between the columns past said tools, a hopper arranged to deliver work onto said conveyor means, and a return conveyor means below the first conveyor means and likewise comprising individual conveyors independently mounted on the respective columns and leading from a point beyond the first conveyor means back to a point adjacent said hopper.

6. A device of the character described, comprising the combination with conveyor means, of a hopper comprising four corner sections above the conveyor means and adapted to discharge work pieces thereon, work supporting pawls associated with two of said sections, means associated with the same sections for retracting said pawls, and means associated with the other sections comprising cam follower elements disposed in the path of work advance on said conveyor means and in operative connection with said pawl retracting means for the operation thereof in synchronism will work advance on said conveyor means from said hopper, together with supports for said hopper corner sections upon which said sections are relatively movable to and from each other to receive work pieces of differing sizes.

7. In a machine of the character described, the combination with columns and means supporting them for relative adjustment to and from each other, of endless carriers mounted upon the respective columns and together constituting a conveyor, said carriers being movable to and from each other with the respective columns, a hopper comprising four corner sections located in pairs adjacent the respective carriers and connected to the respective columns to partake of relative adjustment therebetween, whereby the dimensions of said hopper and spacing between said carriers are concurrently variable in accordance with the adjustment of said columns, work supporting pawls associated with hopper sections located opposite each other in connection with the respective columns, means associated with the same hopper sections for retracting said pawls, and means associated with at least one of the other hopper sections comprising a work actuated member disposed in the path of work advanced from said hopper on said conveyor, said member being provided with connections for the actuation of said pawl retracting means in synchronism with work advance.

8. The device of claim 7 in which certain of the hopper corner sections are provided with means adjustably mounting them upon the respective columns for relative adjustment between the hopper sections comprising a pair mounted on a particular column, such adjustment being parallel to the direction of conveyor movement whereby not only to adapt the hopper to receive work of differing sizes but concurrently to vary the spacing between the work actuated member and the work supporting pawl in accordance with the dimensions of the work for which the hopper is adjusted.

9. A device of the character described comprising the combination with conveyor means, of a hopper comprising work confining parts spaced longitudinally of the conveyor means and supports for said parts upon which said parts are relatively adjustable longitudinally of the conveyor means, whereby to vary the dimensions of the hopper in the direction of conveyor movement, retractible work supporting means connected with one of said hopper parts, a work responsive member connected with the other of said hopper parts, and means for retraction of said work supporting means upon the engagement of said member by a work piece previously released, whereby the adjustment of the hopper to receive work pieces of differing dimensions is automatically effected to vary the spacing at which work pieces will be released.

10. A device of the character described comprising the combination with conveyor means, of a hopper comprising work confining parts spaced longitudinally of the conveyor means and relatively adjustable in the direction of conveyor movement, a work supporting pawl retractively mounted upon one of said parts, a work engageable finger in predetermined spacing with reference to the other of said parts to be engaged by work leaving the hopper, pawl retracting means, and means connected with said finger for the actuation of said pawl retracting means in accordance with work which has left the hopper, variation in adjustment between said hopper parts inherently affecting the spacing between the retractible pawl and the work engageable finger whereby the hopper adjustment to accommodate work of a given size will inherently adjust the seating of the pawl retracting means to function at the proper time for work of such size.

11. In a machine of the character described, the combination with a machine base and a pair of spaced columns mounted thereon for relative adjustment, of a tool associated with each of the columns for operating on work fed transversely of the base between the columns, conveyor means comprising coordinated conveyor members independently mounted upon the respective columns for like movement at spaced distances according to the adjustment of the columns for propelling work between the columns, a hopper arranged to deliver work on to said conveyor means and comprising separate hopper sections respectively connected with the columns to be spaced in accordance with column adjustment, and a return conveyor means comprising coordinated conveyor members independently mounted on the respective columns below the members of said first conveyor means, said return conveyor means leaving from a point beyond the first conveyor means back to a point adjacent the hopper for the return of work upon which said tool has acted, the adjustment of said columns concurrently adjusting the dimensions of said hopper and of said first conveyor means and said return conveyor means.

12. In a machine of the character described, the combination with a base and a column fixed thereon, of a second column adjustable upon the base to and from the first column, a work propelling conveyor comprising conveyor members mounted on the respective columns and spaced in accordance with the adjustment of said second column on said base, a return conveyor means comprising conveyor members mounted on the respective columns to partake of the relative adjustment therebetween, said return conveyor means having its work returning flight leading from a point beyond the first conveyor means, a hopper comprising work confining corner sections connected in pairs with respective columns to partake of relative adjustment between the columns, one corner section of each such pair being provided wtih means whereby it is adjustable longitudinally of the first conveyor means, a work supporting pawl retractably mounted in predetermined relation to the rearmost hopper section of each such pair, pawl retracting means, a work engageable member in the path of work delivered by the first conveyor means in said hopper and at predetermined spacing with reference to the more advanced hopper section of at least one of said pairs, means controlled by said work engageable member for energizing said pawl retracting means for the release of a work piece from said hopper in accordance with the position of a work piece which has left said hopper, and means whereby the hopper sections of each pair are relatively adjustable longitudinally of said first conveyor means to vary not only the hopper dimensions in the direction of conveyor movement but also the timing with which said pawl is retracted for the delivery of a work piece of the size to which the hopper is adjusted, the hopper and conveyor adjustments transversely of the path of conveyor movement being concurrently effected by adjustment of the movable column.

13. In a woodworking machine, the combination with a machine base and a first column mounted thereon and having a pair of conveyor guides at differing levels, of a second column adjustable upon the base to and from the first column and provided with a pair of conveyor guides at levels corresponding to those of the guides mounted on the first column, endless conveyors independently mounted upon the respective columns and supported upon the guides of the respective columns to partake of the relative adjustment of such columns, the endless conveyors on the upper guides of the respective columns comprising feed conveyors and the conveyors on the lower guides of the respective columns comprising work return conveyors, and a hopper comprising side sections supported solely from the respective columns whereby to be adjustable with respect to each other in accordance with the relative adjustment of the movable column, said hopper sections being adapted to guide the ends of work pieces respecting the work feed conveyors associated with the respective columns.

CURT G. JOA.